United States Patent
Xin et al.

(10) Patent No.: US 12,131,719 B2
(45) Date of Patent: Oct. 29, 2024

(54) DISPLAYS WITH VARIABLE FRAME RATES

(71) Applicant: Apple Inc., Cupertino, CA (US)

(72) Inventors: Wanqing Xin, San Jose, CA (US);
Mehmet N Agaoglu, Dublin, CA (US);
Gokhan Avkarogullari, San Jose, CA (US); Jenny Hu, Sunnyvale, CA (US);
Alexander K Kan, San Carlos, CA (US); Yuhui Li, Cupertino, CA (US);
James R Montgomerie, Sunnyvale, CA (US); Andrey Pokrovskiy, Mountain View, CA (US); Yingying Tang, Cupertino, CA (US); Chaohao Wang, Shanghai (CN)

(73) Assignee: Apple Inc., Cupertino, CA (US)

( * ) Notice: Subject to any disclaimer, the term of this patent is extended or adjusted under 35 U.S.C. 154(b) by 55 days.

(21) Appl. No.: 17/887,222

(22) Filed: Aug. 12, 2022

(65) Prior Publication Data
US 2023/0077843 A1    Mar. 16, 2023

Related U.S. Application Data

(60) Provisional application No. 63/243,027, filed on Sep. 10, 2021.

(51) Int. Cl.
*G09G 5/36*        (2006.01)
(52) U.S. Cl.
CPC ..... *G09G 5/363* (2013.01); *G09G 2340/0435* (2013.01); *G09G 2370/04* (2013.01); *G09G 2370/22* (2013.01)

(58) Field of Classification Search
CPC ............ G09G 5/363; G09G 2340/0435; G06F 3/0487; G06F 3/0488
See application file for complete search history.

(56) References Cited

U.S. PATENT DOCUMENTS

| | | | |
|---|---|---|---|
| 8,749,707 B2 | 6/2014 | White et al. | |
| 9,552,623 B1 | 1/2017 | Cheng et al. | |
| 10,368,031 B2 | 7/2019 | Xu et al. | |
| 10,510,317 B2 | 12/2019 | Spence et al. | |
| 2010/0079669 A1 | 4/2010 | Hattori et al. | |
| 2010/0149110 A1* | 6/2010 | Gray | G06F 3/0445 345/173 |

(Continued)

*Primary Examiner* — Antonio A Caschera
(74) *Attorney, Agent, or Firm* — Treyz Law Group, P.C.; Kendall P. Woodruff (57) ABSTRACT

An electronic device may include a display. Control circuitry may operate the display at different frame rates such as 60 Hz, 80 Hz, and 120 Hz. The control circuitry may determine which frame rate to use based on a speed of animation on the display and based on a type of animation on the display. To mitigate the appearance of judder as the display frame rate changes, the control circuitry may implement techniques such as hysteresis (e.g., windows of tolerance around speed thresholds to ensure that the display frame rate does not change too frequently as a result of noise), speed thresholds that are based on a user perception study, consistent latency between touch input detection and corresponding display output across different frame rates (e.g., using a fixed touch scan rate that is independent of frame duration), and animation-specific speed thresholds for triggering frame rate changes.

15 Claims, 7 Drawing Sheets

| ANIMATION TYPE | SPEED THRESHOLD | | |
|---|---|---|---|
| | 120Hz | 80Hz | 60Hz |
| SINGLE EDGE MOVEMENT | W1 | W2 | W3 |
| MULTI-EDGE MOVEMENT | W4 | W5 | W6 |
| LONG TRAVEL DISTANCE | W7 | W8 | W9 |
| LOCAL ANIMATION | W10 | W11 | W12 |
| COLOR OR SHADE CHANGE ONLY | W13 | W14 | W15 |

(56) References Cited

U.S. PATENT DOCUMENTS

| | | | |
|---|---|---|---|
| 2013/0257752 A1* | 10/2013 | Tripathi | G09G 3/20 |
| | | | 345/545 |
| 2019/0034026 A1 | 1/2019 | Yeh et al. | |
| 2019/0146620 A1* | 5/2019 | Suyama | G06F 3/0412 |
| | | | 345/174 |
| 2019/0282893 A1* | 9/2019 | Yamazaki | A63F 13/92 |
| 2021/0142749 A1* | 5/2021 | Han | G09G 3/3611 |

* cited by examiner

| ANIMATION TYPE | SPEED THRESHOLD | | |
|---|---|---|---|
| | 120Hz | 80Hz | 60Hz |
| SINGLE EDGE MOVEMENT | W1 | W2 | W3 |
| MULTI-EDGE MOVEMENT | W4 | W5 | W6 |
| LONG TRAVEL DISTANCE | W7 | W8 | W9 |
| LOCAL ANIMATION | W10 | W11 | W12 |
| COLOR OR SHADE CHANGE ONLY | W13 | W14 | W15 |

*FIG. 7*

DISPLAYS WITH VARIABLE FRAME RATES

This application claims the benefit of provisional patent application No. 63/243,027, filed Sep. 10, 2021, which is hereby incorporated by reference herein in its entirety.

FIELD

This relates generally to electronic devices and, more particularly, to electronic devices with displays.

BACKGROUND

Electronic devices often include displays. For example, cellular telephones and portable computers include displays for presenting information to users. An electronic device may have an organic light-emitting diode display based on organic-light-emitting diode pixels or a liquid crystal display based on liquid crystal pixels.

If care is not taken, displays may consume excessive power in an electronic device, leading to poor battery life and diminished performance.

SUMMARY

An electronic device may include a display. The display may include an array of pixels such as organic light-emitting diode pixels or liquid crystal display pixels. The display may include display driver circuitry that is configured to provide image data to columns of pixels in the display. The display may also include gate driver circuitry that is configured to provide control signals to rows of pixels in the display.

Control circuitry may operate the display at different frame rates such as 60 Hz, 80 Hz, 120 Hz, and/or other suitable frame rates. The control circuitry may determine which frame rate to use based on a speed of animation on the display and based on a type of animation on the display (e.g., single-edge movements versus multiple-edge movements, long-distance movements versus localized movements, animations that involve color or shade changes only without movement, etc.).

To mitigate the appearance of judder as the display frame rate changes, the control circuitry may implement techniques such as applying hysteresis (e.g., windows of tolerance around speed thresholds to ensure that the display frame rate does not change too frequently as a result of noise), using speed thresholds that are based on a user perception study to ensure that judder is not noticeable to the user, maintaining consistent latency between touch input detection and corresponding display output across different frame rates (e.g., using a fixed touch scan rate that is independent of frame duration), and using animation-specific speed thresholds for triggering frame rate changes.

DETAILED DESCRIPTION

Figure 1:
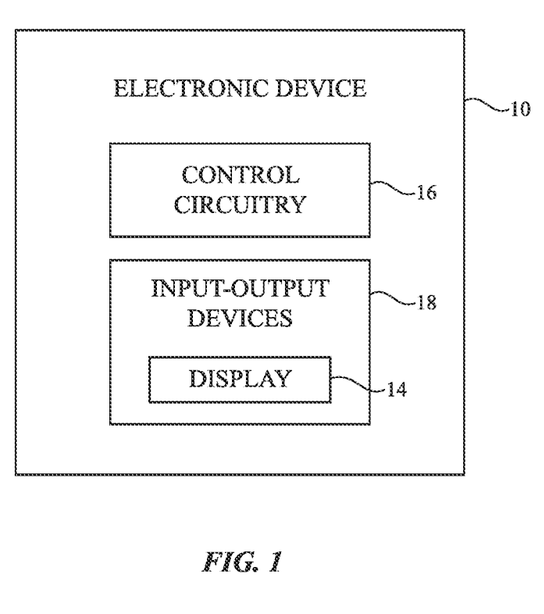
FIG. 1 is a schematic diagram of an illustrative electronic device having a display in accordance with an embodiment.

An illustrative electronic device of the type that may be provided with a display is shown in FIG. 1. Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a display, a computer display that contains an embedded computer, a computer display that does not contain an embedded computer, a television, a gaming device, a navigation device, an embedded system such as a system in which electronic equipment with a display is mounted in a kiosk or automobile, or other electronic equipment. Electronic device 10 may have the shape of a pair of eyeglasses (e.g., supporting frames), may form a housing having a helmet shape, or may have other configurations to help in mounting and securing the components of one or more displays on the head or near the eye of a user.

As shown in FIG. 1, electronic device 10 may have control circuitry 16. Control circuitry 16 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc.

Input-output circuitry in device 10 such as input-output devices 18 may be used to allow data to be supplied to device 10 and to allow data to be provided from device 10 to external devices. Input-output devices 18 may include buttons, joysticks, scrolling wheels, touch pads, key pads, keyboards, microphones, speakers, tone generators, vibrators, cameras, sensors, light-emitting diodes and other status indicators, data ports, etc. A user can control the operation of device 10 by supplying commands through input-output devices 18 and may receive status information and other output from device 10 using the output resources of input-output devices 18.

Input-output devices 18 may include one or more displays such as display 14. Display 14 may be a touch screen display that includes a touch sensor for gathering touch input from a user or display 14 may be insensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements.

Control circuitry 16 may be used to run software on device 10 such as operating system code and applications. During operation of device 10, the software running on control circuitry 16 may display images on display 14.

Display 14 may be an organic light-emitting diode (OLED) display, a display formed from an array of discrete light-emitting diodes each formed from a crystalline semiconductor die, a liquid crystal display (LCD), or any other suitable type of display. Electronic device 10 may have a housing (e.g., formed from metal, glass, plastic, or a combination of two or more of these materials) that houses display 14 and forms exterior surfaces of the electronic device (e.g., the housing may form a rear face and sidewalls of the electronic device and the display may form the front face of the electronic device).

Figure 2:
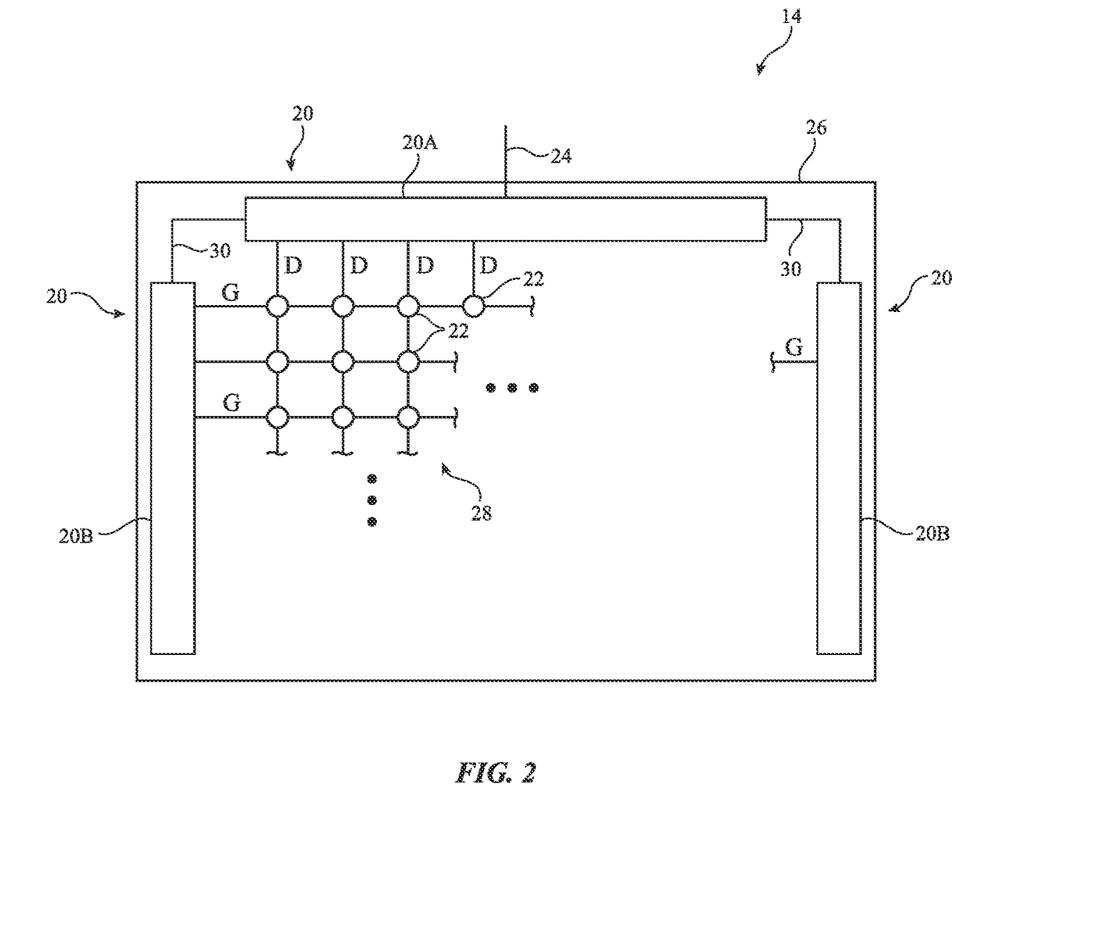
FIG. 2 is a schematic diagram of an illustrative display in accordance with an embodiment.

FIG. 2 is a diagram of an illustrative display. As shown in FIG. 2, display 14 may include layers such as substrate layer 26. Substrate layers such as layer 26 may be formed from rectangular planar layers of material or layers of material with other shapes (e.g., circular shapes or other shapes with one or more curved and/or straight edges). The substrate layers of display 14 may include glass layers, polymer layers, composite films that include polymer and inorganic materials, metallic foils, etc.

Display 14 may have an array of pixels 22 for displaying images for a user such as pixel array 28. Pixels 22 in array 28 may be arranged in rows and columns. The edges of array 28 (sometimes referred to as active area 28) may be straight or curved (i.e., each row of pixels 22 and/or each column of pixels 22 in array 28 may have the same length or may have a different length). There may be any suitable number of rows and columns in array 28 (e.g., ten or more, one hundred or more, or one thousand or more, etc.). Display 14 may include pixels 22 of different colors. As an example, display 14 may include red pixels, green pixels, and blue pixels. If desired, a backlight unit may provide backlight illumination for display 14.

Display driver circuitry 20 may be used to control the operation of pixels 28. Display driver circuitry 20 may be formed from integrated circuits, thin-film transistor circuits, and/or other suitable circuitry. Illustrative display driver circuitry 20 of FIG. 2 includes display driver circuitry 20A and additional display driver circuitry such as gate driver circuitry 20B. Gate driver circuitry 20B may be formed along one or more edges of display 14. For example, gate driver circuitry 20B may be arranged along the left and right sides of display 14 in an inactive area of the display as shown in FIG. 2. Gate driver circuitry 20B may include gate drivers and emission drivers.

As shown in FIG. 2, display driver circuitry 20A (e.g., one or more display driver integrated circuits, thin-film transistor circuitry, etc.) may contain communications circuitry for communicating with system control circuitry over signal path 24. Path 24 may be formed from traces on a flexible printed circuit or other cable. The control circuitry may be located on one or more printed circuits in electronic device 10. During operation, the control circuitry (e.g., control circuitry 16 of FIG. 1) may supply circuitry such as a display driver integrated circuit in circuitry 20 with image data for images to be displayed on display 14. Display driver circuitry 20A of FIG. 2 is located at the top of display 14. This is merely illustrative. Display driver circuitry 20A may be located at both the top and bottom of display 14 or in other portions of device 10.

To display the images on pixels 22, display driver circuitry 20A may supply corresponding image data to data lines D (e.g., vertical signal lines) while issuing control signals to supporting display driver circuitry such as gate driver circuitry 20B over signal paths 30. With the illustrative arrangement of FIG. 2, data lines D run vertically through display 14 and are associated with respective columns of pixels 22. During compensation operations, column driver circuitry 20 may use paths such as data lines D to supply a reference voltage.

Gate driver circuitry 20B (sometimes referred to as gate line driver circuitry or horizontal control signal circuitry) may be implemented using one or more integrated circuits and/or may be implemented using thin-film transistor circuitry on substrate 26. Horizontal control lines G (sometimes referred to as gate lines, scan lines, emission control lines, etc.) run horizontally through display 14. Each gate line G is associated with a respective row of pixels 22. If desired, there may be multiple horizontal control lines such as gate lines G associated with each row of pixels. Individually controlled and/or global signal paths in display 14 may also be used to distribute other signals (e.g., power supply signals, etc.). The number of horizontal signal lines in each row may be determined by the number of transistors in the display pixels 22 that are being controlled independently by the horizontal signal lines. Display pixels of different configurations may be operated by different numbers of control lines, data lines, power supply lines, etc.

Gate driver circuitry 20B may assert control signals on the gate lines G in display 14. For example, gate driver circuitry 20B may receive clock signals and other control signals from circuitry 20A on paths 30 and may, in response to the received signals, assert a gate line signal on gate lines G in sequence, starting with the gate line signal G in the first row of pixels 22 in array 28. As each gate line is asserted, data from data lines D may be loaded into a corresponding row of pixels. In this way, control circuitry such as display driver circuitry 20A and 20B may provide pixels 22 with signals that direct pixels 22 to display a desired image on display 14. Each pixel 22 may have a light-emitting diode and circuitry (e.g., thin-film circuitry on substrate 26) that responds to the control and data signals from display driver circuitry 20. If desired, control circuitry 16 may operate display 14 at different frame rates.

Figure 3:
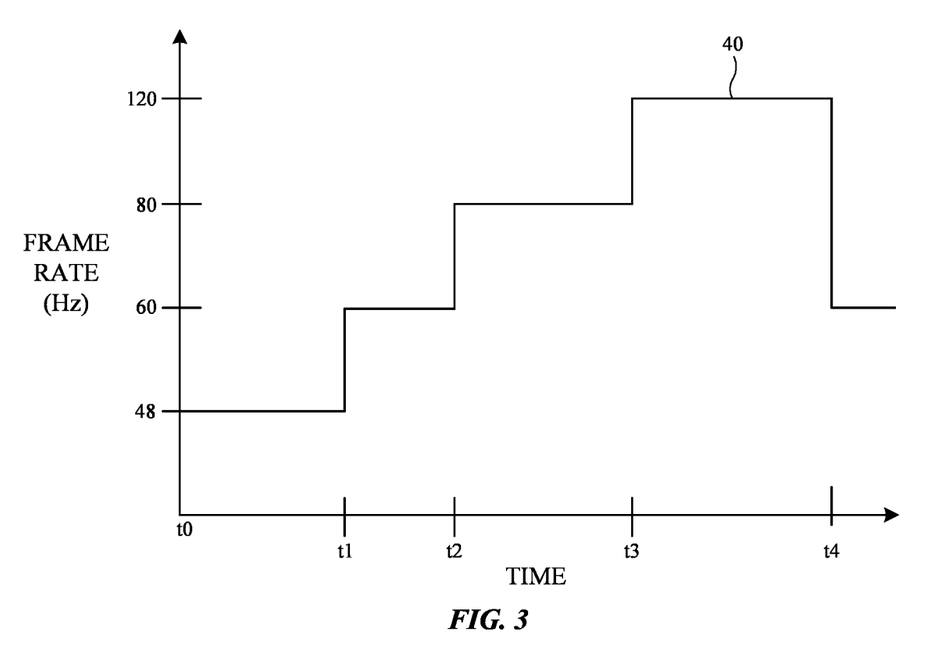
FIG. 3 is a graph illustrating an example of how a display frame rate may change over time in accordance with an embodiment.

Implementing variable frame duration may help improve image quality and decrease power consumption. Curve 40 of FIG. 3 illustrates how a display frame rate may change over time. As shown in FIG. 3, display 14 may operate at a frame rate of 48 Hz from time t0 to time t1, may operate at a frame rate of 60 Hz from time t1 to time t2, may operate at a frame rate of 80 Hz from time t2 to time t3, may operate at a frame rate of 120 Hz from time t3 to time t4, and may return to a frame rate of 60 Hz at time t4.

If desired, control circuitry 16 may take animation speed and animation type into account when deciding an appropriate frame rate for display 14. Animation speed may be represented by a number of pixels travelled per second by a moving image (e.g., the rate at which content moves across display 14, measured in pixels per second or any other suitable unit). When animation speed is low (e.g., within some range of low speeds), for example, control circuitry 16 may use a lower frame rate (and thus longer frame duration) to decrease power consumption. When animation speed is high (e.g., within some range of high speeds), control circuitry 16 may use a higher frame rate (and thus shorter frame duration) to maintain image quality.

Control circuitry 16 may use one or more animation speed thresholds for determining whether to switch frame rates. For example, the transition from a 48 Hz frame rate to a 60 Hz frame rate at time t1 may be in response to control circuitry 16 determining that the animation speed on display 14 exceeds a first animation speed threshold; the transition from a 60 Hz frame rate to a 80 Hz frame rate at time t2 may be in response to control circuitry 16 determining that the animation speed on display 14 exceeds a second animation speed threshold; the transition from a 80 Hz frame rate to a 120 Hz frame rate at time t3 may be in response to control circuitry 16 determining that the animation speed on display 14 exceeds a third animation speed threshold; and the transition from a 120 Hz frame rate to a 60 Hz frame rate at time t4 may be in response to control circuitry 16 determining that the animation speed on display 14 is less than a fourth animation speed threshold. The specific sequence of frame rates shown in FIG. 3 is merely illustrative. Other sequences of frame rates may be used, if desired.

Care must be taken to ensure that a change in frame rate does not cause noticeable judder for the user. Judder occurs when an amount of motion blur on display 14 is significantly inconsistent over time. The amount of motion blur (e.g., how big the motion blur appears on display 14) is proportional to an animation speed (e.g., the number of pixels travelled per second by a moving image) multiplied by a frame duration (e.g., 8.3 milliseconds in the case of a 120 Hz frame rate). As such, changing the frame duration will result in a change in the amount of motion blur on display 14. The change in frame duration will not only cause the size of the motion blur to change, but it will also cause the location of the center of the motion blur to change, both of which can be perceived as judder if care is not taken. To avoid perceivable judder in display 14, control circuitry 16 may implement various techniques when changing frame rates. For example, control circuitry 16 may implement hysteresis techniques, speed thresholds that are based on a user perception study to ensure that judder is not noticeable to the user, consistent touch-to-display latency, and animation-specific speed thresholds to reduce the appearance of judder as the frame rate of display 14 changes.

One potential source of noticeable judder is frequent frame rate transition. If the frame rate of display 14 is changed too frequently, judder may be noticeable to the user. Frequent frame rate transition may be triggered if jittery finger movements, touch sensor noise, rounding errors, and/or other noise occurs at a given animation speed. If the animation speed happens to be a threshold for changing frame rates, this type of noise may trigger one or more rapid frame rate transitions, resulting in judder. To mitigate this issue, control circuitry 16 may apply a hysteresis window of tolerance of around each animation speed threshold when deciding whether to switch frame rates. Applying hysteresis in this way may ensure that the current frame rate is maintained as long as possible by filtering out small speed changes that may be a result of noise rather than a result of user intention.

Figure 4:
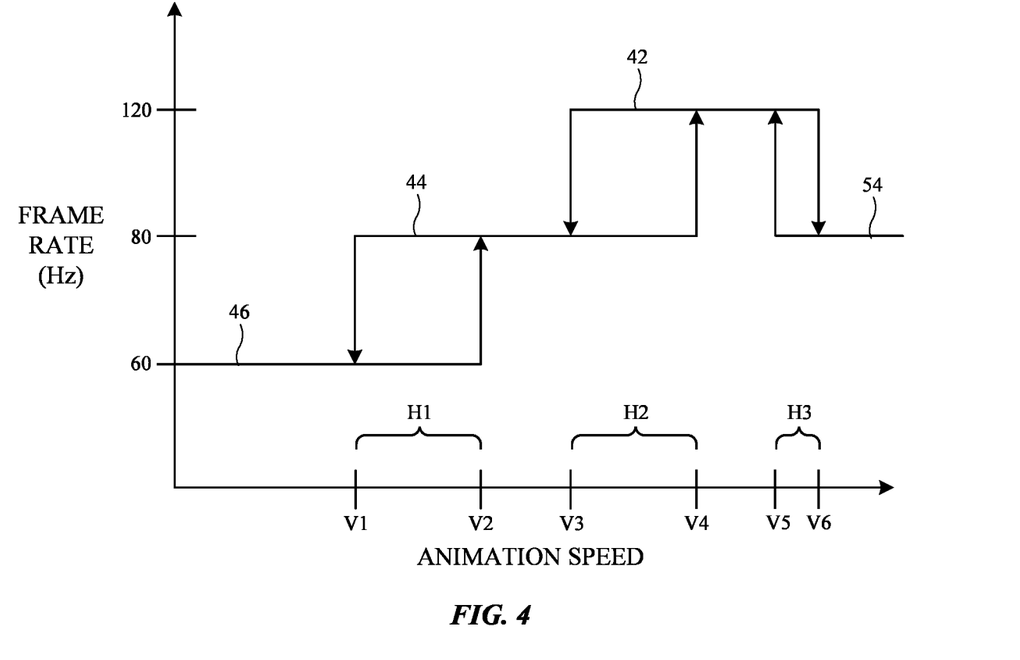
FIG. 4 is a graph showing illustrative hysteresis thresholds that may be applied when determining a display frame rate in accordance with an embodiment.

FIG. 4 is a graph showing how control circuitry 16 may implement hysteresis when determining whether to switch frame rates. Curve 46 illustrates how control circuitry 16 may apply hysteresis window of tolerance H1 when switching between a 60 Hz frame rate and an 80 Hz frame rate and may apply hysteresis window of tolerance H2 when switching between an 80 Hz frame rate and a 120 Hz frame rate. As indicated by curve 46, control circuitry 16 may only switch from the 60 Hz frame rate to the 80 Hz frame rate when animation speeds exceed V2. As indicated by curve 44, control circuitry 16 may only switch from the 80 Hz frame rate to the 60 Hz frame rate when animation speeds drop below V1. Animation speed V2 is greater than animation speed V1. If the animation speed is between V1 and V2 (i.e., if the animation speed falls within tolerance window H1), then control circuitry 16 will not change the frame rate and will instead maintain the previous frame rate (e.g., the frame rate will stay at 60 Hz if the previous frame was 60 Hz and will stay at 80 Hz if the previous frame rate was 80 Hz).

Curve 44 also indicates how control circuitry 16 may only switch from the 80 Hz frame rate to the 120 Hz frame rate when animation speeds exceed V4. Curve 42 indicates how control circuitry 16 may switch from the 120 Hz frame rate to the 80 Hz frame rate when animation speeds drop below V3. Animation speed V4 is greater than animation speed V3. If the animation speed is between V3 and V4 (i.e., if the animation speed falls within tolerance window H2), then control circuitry 16 will not change the frame rate and will instead maintain the previous frame rate (e.g., the frame rate will stay at 120 Hz if the previous frame was 120 Hz and will stay at 80 Hz if the previous frame rate was 80 Hz).

Curve 42 also indicates how control circuitry 16 may switch from the 120 Hz frame rate to the 80 Hz frame rate when animation speeds exceed V6. Curve 54 indicates how control circuitry 16 may switch from the 80 Hz frame rate to the 120 Hz frame rate when animation speeds drop below V5. Animation speed V6 is greater than animation speed V5. If the animation speed is between V5 and V6 (i.e., if the animation speed falls within tolerance window H3), then control circuitry 16 will not change the frame rate and will instead maintain the previous frame rate (e.g., the frame rate will stay at 120 Hz if the previous frame was 120 Hz and will stay at 80 Hz if the previous frame rate was 80 Hz).

If desired, tolerance windows such as H1, H2, and H3 may only be applied to transitions between consecutive frame rates (e.g., between 48 Hz and 60 Hz, between 60 Hz and 80 Hz, between 80 Hz and 120 Hz, but not between 48 Hz and 80 Hz or between 60 Hz and 120 HZ. For example, hysteresis may not be applied when an animation speed change is significant enough to trigger a frame rate change from 120 Hz to 60 Hz or vice versa (e.g., skipping 80 Hz), because such a change is assumed to be a result of user intention and unlikely to be a result of noise.

The capability of the human eye to follow and predict content movement accurately is dependent upon the speed of the animation. For example, judder at higher animation speeds may be less noticeable to a user than judder at lower animation speeds due the physical limitations of the human eye. If desired, the animation speed thresholds that are used to trigger frame rate transitions (e.g., animation speed thresholds V1, V2, V3, and V4 of FIG. 4) may account for this type of judder tolerance variation. In other words, the speed thresholds that trigger frame rate transitions may take into account the fact that a user's tolerance of judder may vary depending on the animation speed. For example, one or more user studies may be used to develop a metric for assigning specific speed thresholds to different frame rate transitions. This may allow for lower frame rates when the animation speed is sufficiently high that the human eye is incapable of precisely following and predicting content movement (and is therefore less likely to notice any judder resulting from the lower frame rate). This is illustrated in FIG. 4 by the fact that animation speeds higher than V6 may result in a decreased frame rate from 120 Hz to 80 Hz.

Abrupt transitions between different display frame rates is another potential source of noticeable judder. The risk of judder associated with transitioning between frame rates (e.g., from 120 Hz to 60 Hz, from 60 Hz to 120 Hz, etc.) is mitigated by using the appropriate speed thresholds for changing frame rates. Some or all of the speed thresholds may be determined based on a judder metric that is developed based on a user perception study to ensure that transition judder is not noticeable to the user. In addition to taking scrolling speed into account, control circuitry 16 may take into account acceleration and/or deceleration in scrolling speed. For example, when acceleration of scrolling (and the associated display animation) is significant enough, judder may not be noticeable. In this way, frame rate transition may only take place when the transition judder is not noticeable to most users.

Figure 5:
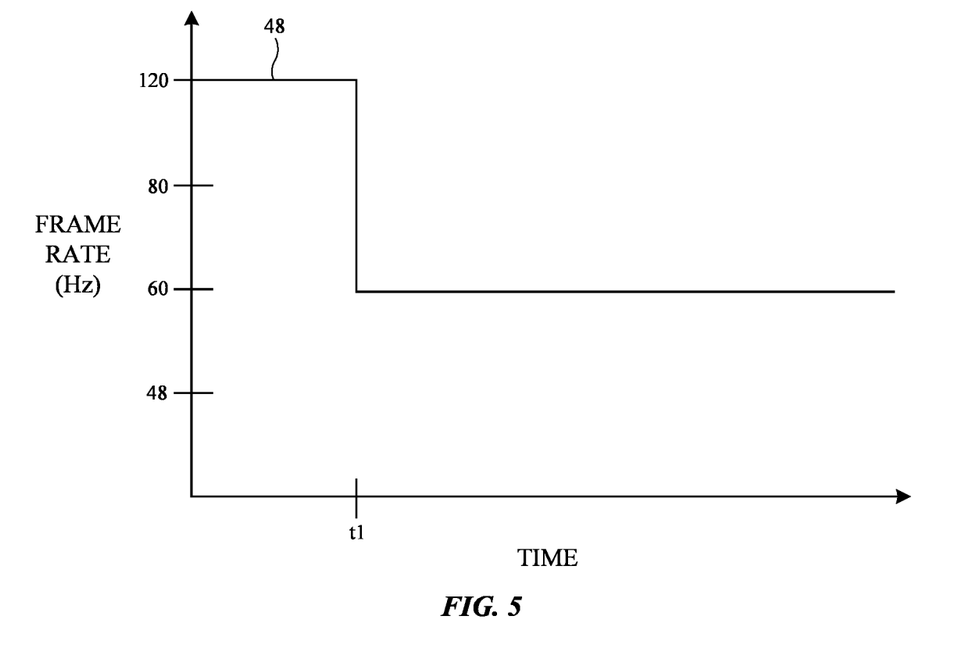
FIG. 5 is a graph showing how a display frame rate may be adjusted in accordance with an embodiment.

FIG. 5 shows an example of how display 14 may change frame rates over time. Curve 48 corresponds to the display frame rate of display 14. During the time period before time t1, display 14 may be operating at a 120 Hz frame rate. At time t1, control circuitry 16 may determine that the animation speed on display 14 has dropped below a given speed threshold and that the frame rate of display 14 should therefore be reduced to 60 Hz. As shown in FIG. 5, display 14 may switch from 120 Hz to 60 Hz at time t1. Because the speed threshold that triggers the switch from 120 Hz to 60 Hz at time t1 is based on a user perception study, this type of frame rate transition is unlikely to lead to noticeable judder, despite the abrupt transition. For example, the user perception study may indicate that certain speeds (e.g., speeds associated with a fast moving finger performing various scrolling gestures on display 14) are fast enough that judder will not be noticeable. This is merely illustrative, however. If desired, display 14 may display at least one frame at an intermediate frame rate such as 80 Hz during the transition from 120 Hz to 60 Hz.

Figure 6:
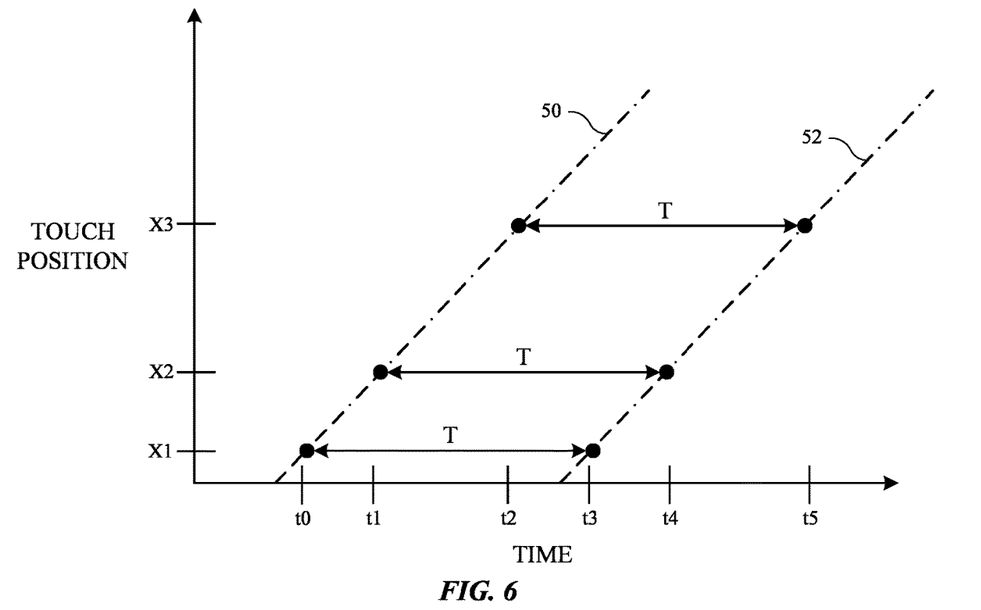
FIG. 6 is a graph showing how a latency between touch position detection and touch position display rendering may be controlled to avoid judder in accordance with an embodiment.

FIG. 6 is a graph showing how latency issues that may result in judder may be mitigated. Curve 50 of FIG. 6 illustrates how a touch position (e.g., a position of touch input) detected by a touch sensor in display 14 changes over time. Curve 52 illustrates how a touch position is rendered on display 14 over time (e.g., how display output associated with the touch input changes over time). For example, when a user is scrolling content on a display, the user's finger may move from a first position x1 at time t0, to a second position x2 at time t1, to a third position x3 at time t3, as illustrated by curve 50. Due to latency in touch event delivery (e.g., a lag between touch input detection and corresponding updated display content rendered on display 14), a small gap of time exists between when a touch position is detected and when the touch position is rendered on display 14. For example, as illustrated by curve 52, display 14 may render the display content at touch position x1 at time t3, which is separated from time t1 by time lag T. Similarly, time lag T exists between touch position detection at position x2 at time t1 and touch position rendering at position x2 at time t4.

Care must be taken to ensure that display frame rate changes do not introduce inconsistent latency in touch event delivery. If the time lag T between touch event detection and touch event rendering changes over time, this inconsistent latency may cause a spatial lag in touch event delivery, which in turn may be perceived as judder. Consider a scenario in which the frame rate of display 14 is operating at 120 Hz between times t0 and t1. At time t1, the frame rate of display 14 may change from 120 Hz (e.g., 8.3 ms frame duration) to 80 Hz (e.g., 12.5 ms frame duration). If the time lag T between touch event detection at position x3 and touch event delivery at position x3 also increases between times t1 and t2, then this inconsistent time lag and corresponding inconsistent spatial lag may result in visible judder as the user scrolls content or otherwise moves content on the display using touch input.

To mitigate this issue, control circuitry 16 may maintain a fixed latency T between touch position detection and touch position rendering, even if the frame rate changes. In particular, the interval between selected touch events may be adjusted to adapt to the frame rate change to keep latency T consistent. For example, the time interval between rendered touch positions x1 at time t3 and x2 at time t4 may be 8.3 ms (e.g., corresponding to the 120 Hz frame rate), whereas the time interval between rendered touch positions x2 at time t4 and x3 at time t5 may be 12.5 ms (e.g., corresponding to the 80 Hz frame rate) to maintain a consistent latency T.

To enable this, control circuitry 16 may set the touch streaming rate to a relatively high value (e.g., a rate equal to the maximum available frame frate for the display such as 120 Hz, 240 Hz, or other suitable touch streaming rate). For example, control circuitry 16 may interpolate a 120 Hz touch scan rate up to 240 Hz to ensure smooth scrolling responsiveness even when the frame rate changes from 120 Hz to 80 Hz or from 80 Hz to 60 Hz. Using an interpolated touch scan rate allows control circuitry 16 to select an interpolated touch event if an actual detected touch is not available at the required time to avoid latency changes. Control circuitry 16 may interpolate the touch location based on nearby detected touch locations (e.g., position x3 may be interpolated based on nearby detected touch positions to maintain consistent touch-to-display latency T across different frame rates). As such, even if the frame rate changes from 120 Hz to 80 Hz at time t1, the time lag T between touch event detection at position x3 at time t2 and touch event delivery at position x3 at time t5 may remain the same.

Figure 7:
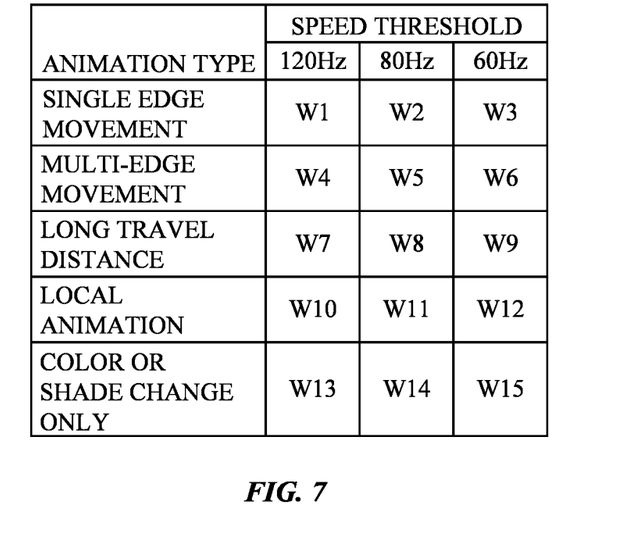
FIG. 7 is a table showing how different speed thresholds may be applied to different animation types when switching between different display frame rates in accordance with an embodiment.

FIG. 7 is a table illustrating how different speed thresholds may be assigned to different types of animations. In general, higher animation speeds may trigger higher refresh rates. However, some exceptions may apply and different types of animation may be less vulnerable to judder than others. When the tolerance for judder for a given type of animation is higher (e.g., when animation speeds exceed a given threshold such as V6 of FIG. 4), display 14 can take advantage of a lower frame rate and decreased power consumption without causing visual disruptions for the user. As such, the speed thresholds that trigger frame rate transitions may take into account the fact that a user's tolerance of judder may vary depending on the type of animation. The speed thresholds may be determined based on a judder metric that is developed based on a user perception study to ensure that transition judder is not noticeable to the user. In this way, frame rate transition may only take place when the transition judder is not noticeable to most users.

For example, for animations that involve single edge movements such as scrolling, control circuitry 16 may use a first set of thresholds W1, W2, and W3. Thresholds W1, W2, and W3 may be based on the fact that the human eye can track single-edge movements better than multiple-edge movements and will thus be less tolerant of judder.

For animations that involve multiple edge movements such as zooming in and out, launching applications, etc., control circuitry 16 may use a second set of thresholds such as W4, W5, and W6. Thresholds W4, W5, and W6 may be based on the fact that the human eye will have difficulty tracking movement of multiple edges at once. If desired, control circuitry 16 may use the speed of the fastest moving edge to determine whether to switch frame rates (e.g., may compare the speed of the fastest moving edge to thresholds W4, W5, and W6 of FIG. 7).

For animations that involve long travel distances, control circuitry 16 may use a third set of thresholds such as W7, W8, and W9. Thresholds W7, W8, and W9 may be selected based on the fact that the human eye is more sensitive to judder for longer travel distances due to better eye pursuit capabilities.

For localized animations, control circuitry 16 may use a fourth set of thresholds such as W10, W11, and W12. Thresholds W10, W11, and W12 may be selected based on the fact that the human eye is less sensitive to judder when the animation is contained to a relatively small space within display 14 (e.g., animations in a search bar on display 14, animations in a small icon at the corner of an image, etc.).

For animations that involve a color or shade change only (e.g., without movement), control circuitry 16 may use a fifth set of thresholds such as W13, W14, and W15. Thresholds W13, W14, and W15 may be selected based on the fact that the user may have a higher tolerance for judder in an animation that involves only a shade or color change without any movement.

The examples of FIG. 7 are merely illustrative. If desired, other types of animations may be taken into account when determining appropriate speed thresholds for triggering frame rate changes in display 14. Some of the speed thresholds for different animation types may be the same, if desired. Although only a single threshold is shown for each frame rate transition in FIG. 7, control circuitry 16 may impose hysteresis windows of tolerance around each threshold to avoid changing frame rates too frequently (e.g., each threshold shown in FIG. 7 may be one of two speed thresholds that are used to decide whether to transition between frame rates, as discussed in connection with FIG. 4).

The foregoing is merely illustrative and various modifications can be made by those skilled in the art without departing from the scope and spirit of the described embodiments. The foregoing embodiments may be implemented individually or in any combination.

What is claimed is:

1. A display, comprising:
    an array of pixels configured to display moving content at an animation speed; and
    control circuitry configured to:
        compare the animation speed to first and second speed thresholds, wherein the second speed threshold is higher than the first speed threshold and wherein the first and second speed thresholds are based on a type of animation being displayed and whether the type of animation involves single-edge movement or multiple-edge movement;
        change a frame rate of the display from a first frame rate to a second frame rate when the animation speed is greater than the second speed threshold, wherein the second frame rate is higher than the first frame rate; and
        change the frame rate of the display from the second frame rate to the first frame rate when the animation speed is less than the first speed threshold.

2. The display defined in claim 1 wherein the control circuitry is configured to maintain the frame rate of the display at a previous frame rate when the animation speed is between the first and second speed thresholds.

3. The display defined in claim 1 wherein the first and second speed thresholds are based on a user perception study.

4. The display defined in claim 1 wherein the first and second speed thresholds are based on an amount of space across which the type of animation spans on the display.

5. The display defined in claim 1 wherein the display comprises a touch sensor configured to detect a touch input, wherein the display is configured to display output associated with the touch input, and wherein a latency between when the touch event is detected and when the output is displayed remains constant as the display switches between the first and second frame rates.

6. A display, comprising:
    an array of pixels configured to display moving content at an animation speed; and
    control circuitry configured to:
        compare the animation speed to first and second speed thresholds, wherein the second speed threshold is higher than the first speed threshold and wherein the first and second speed thresholds are based on a type of animation being displayed;
        change a frame rate of the display from a first frame rate to a second frame rate when the animation speed is greater than the second speed threshold, wherein the second frame rate is higher than the first frame rate;
        change the frame rate of the display from the second frame rate to the first frame rate when the animation speed is less than the first speed threshold;
        compare the animation speed to third and fourth speed thresholds, wherein the fourth speed threshold is higher than the third speed threshold;
        change the frame rate of the display from the second frame rate to a third frame rate when the animation speed is greater than the fourth speed threshold, wherein the third frame rate is higher than the second frame rate; and
        change the frame rate of the display from the third frame rate to the second frame rate when the animation speed is less than the third speed threshold.

7. The display defined in claim 6 wherein the control circuitry is configured to maintain the frame rate of the display at a previous frame rate when the animation speed is between the third and fourth speed thresholds.

8. The display defined in claim 6 wherein the third and fourth speed thresholds are based on a user perception study.

9. A display, comprising:
    a touch sensor configured to detect touch input;
    a display configured to display output associated with the touch input; and
    control circuitry configured to change a frame rate of the display based on a speed of animation on the display, wherein a latency between when the touch event is detected and when the output is displayed remains constant as the frame rate of the display changes.

10. The display defined in claim 9 wherein the control circuitry gathers touch sensor data at a fixed touch scan rate that is independent of the frame rate.

11. The display defined in claim 10 wherein the control circuitry is configured to interpolate a touch position based on nearby detected touch positions.

12. The display defined in claim 10 wherein the fixed touch scan rate is 120 Hz.

13. The display defined in claim 12 wherein the control circuitry is configured to change the frame rate of the display from 120 Hz to 80 Hz while the fixed touch scan rate remains at 120 Hz.

14. A display, comprising:
an array of pixels configured to display a given type of animation at an animation speed; and
control circuitry configured to:
compare the animation speed with a speed threshold, wherein the speed threshold is based on the given type of animation and wherein the given type of animation is selected from the group consisting of: single-edge movement, multiple-edge movement, and color change animation without movement; and
determine a frame rate for the display based on the animation speed and based on the given type of animation.

15. The display defined in claim 14 wherein the speed threshold is based on a user perception study.

* * * * *